(12) United States Patent
Bono et al.

(10) Patent No.: US 9,430,492 B1
(45) Date of Patent: Aug. 30, 2016

(54) EFFICIENT SCAVENGING OF DATA AND METADATA FILE SYSTEM BLOCKS

(71) Applicant: EMC Corporation, Hopkinton, MA (US)

(72) Inventors: Jean-Pierre Bono, Westborough, MA (US); Morgan Clark, South Orange, NJ (US); Michael Scheer, Summit, NJ (US); William C. Davenport, Burlington, MA (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 13/929,887

(22) Filed: Jun. 28, 2013

(51) Int. Cl.
  *G06F 17/30* (2006.01)
(52) U.S. Cl.
  CPC ............... *G06F 17/30221* (2013.01)
(58) Field of Classification Search
  CPC ............ G06F 17/30117; G06F 17/30138
  USPC .......................................... 707/651
  See application file for complete search history.

(56) References Cited

U.S. PATENT DOCUMENTS

| | | | |
|---|---|---|---|
| 6,487,563 B1 | 11/2002 | Houldsworth | |
| 7,254,685 B1 | 8/2007 | Cardente | |
| 7,631,155 B1 | 12/2009 | Bono et al. | |
| 7,849,263 B1 | 12/2010 | French | |
| 8,140,814 B2 | 3/2012 | Agombar et al. | |
| 8,285,758 B1 | 10/2012 | Bono et al. | |
| 8,429,307 B1 | 4/2013 | Faibish et al. | |
| 8,433,869 B1 | 4/2013 | Natanzon et al. | |
| 8,566,371 B1 | 10/2013 | Bono et al. | |
| 8,645,654 B1 | 2/2014 | Bailey et al. | |
| 8,782,324 B1 | 7/2014 | Chen et al. | |
| 2004/0030668 A1 | 2/2004 | Pawlowski et al. | |
| 2004/0205289 A1 | 10/2004 | Srinivasan | |
| 2009/0271564 A1* | 10/2009 | Sugimoto et al. | 711/103 |
| 2010/0332846 A1* | 12/2010 | Bowden et al. | 713/189 |
| 2014/0201491 A1* | 7/2014 | Luan et al. | 711/173 |

OTHER PUBLICATIONS

Bono, et al., "Unified Datapath Processing with Virtualized Storage Processors," U.S. Appl. No. 13/828,294, filed Mar. 14, 2013.
Bono, et al., "Providing Multi-Tenancy Within a Data Storage Apparatus," U.S. Appl. No. 13/837,869, filed Mar. 15, 2013.

(Continued)

*Primary Examiner* — James Trujillo
*Assistant Examiner* — Jessica N Le
(74) *Attorney, Agent, or Firm* — BainwoodHuang

(57) ABSTRACT

An improved technique involves identifying the location of backed free blocks, i.e., blocks within an upper deck file system that have been provisioned from storage devices of a data storage system to a lower deck file system, allocated from the lower deck file system to the upper deck file system, and later freed from the upper deck file system. A storage processor accesses a set of data structures that identifies backed free blocks as opposed to free blocks that have not been written into and thus do not correspond to any allocated blocks in storage. Once the storage processor identifies the backed free blocks, the storage processor frees each block in the lower deck file system from which the respective backed free block was allocated. The storage processor then updates the set of data structures to indicate that the respective backed free block is now simply a free block.

21 Claims, 4 Drawing Sheets

(56) References Cited

OTHER PUBLICATIONS

Bono et al., "Performing a Non-Disruptive Software Upgrade on Physical Storage Processors Having Access to Virtual Storage Processors," U.S. Appl. No. 13/838,498, filed Mar. 15, 2013.

Bono, et al., "Unified Data Protection for Block and File Objects," U.S. Appl. No. 13/853,508, filed Mar. 29, 2013.

Bono, et al., "File System Inline Fine Grained Tiering," U.S. Appl. No. 13/928,591, filed Jun. 27, 2013.

Bono, et al., "Data Storage System With Unified System Cache," U.S. Appl. No. 13/930,164, filed Jun. 28, 2013.

Bono, et al., "Unified Data Services for Block and File Objects," U.S. Appl. No. 13/853,284, filed Mar. 29, 2013.

Bono, et al., "File System Over Fully Provisioned Volume File in Direct Mode," U.S. Appl. No. 13/931,757, filed Jun. 28, 2013.

Bono, et al., "File System Snapshots Over Fully Provisioned Volume File in Direct Mode," U.S. Appl. No. 13/931,764, filed Jun. 28, 2013.

Bono, et al., "File System Over Thinly Provisioned Volume File in Mapped Mode," U.S. Appl. No. 13/931,769, filed Jun. 28, 2013.

Bono, et al., "File System Snapshots Over Thinly Provisioned Volume File in Mapped Mode," U.S. Appl. No. 13/931,775, filed Jun. 28, 2013.

Bono, et al., "File System Shrink for Directly and Thinly Provisioned File Systems," U.S. Appl. No. 13/929,879, filed Jun. 28, 2013.

Bono, et al., "Deduplicating Container Files," U.S. Appl. No. 13/930,010, filed Jun. 28, 2013.

Bono, et al., "Reclaiming Space From File System Hosting Many Primary Storage Objects and Their Snapshots," U.S. Appl. No. 14/319,455, filed Jun. 30, 2014.

Bono, et al., "Proactive Scavenging of the File System Snaps," U.S. Appl. No. 14/319,660, filed Jun. 30, 2014.

Bono, "Unified Datapath Architecture," U.S. Appl. No. 13/828,322, filed Mar. 14, 2013.

Bono, et al., "Managing Host Data Placed in a Container File System on a Data Storage Array Having Multiple Storage Tiers," U.S. Appl. No. 13/929,019, filed Jun. 28, 2013.

Bono, et al., "Persistent Metadata Cache," U.S. Appl. No. 14/576,931, filed Dec. 19, 2014.

Bono, et al., "Preserving Quality of Service When Replicating Data Objects," U.S. Appl. No. 14/576,939, filed Dec. 19, 2014.

\* cited by examiner

90

92 — Accessing, by a storage processor of the data storage apparatus, a set of data structures to identify the location of each of a set of backed free blocks within the upper deck file system, wherein backed free blocks are blocks that have been provisioned from storage devices of the data storage apparatus to the lower deck file system, allocated from the lower deck file system to the upper deck file system, and later freed from the upper deck file system

94 — For each of the set of backed free blocks, (i) freeing the block in the lower deck file system from which the respective backed free block was allocated and (ii) updating the set of data structures to indicate that the respective back free block is no longer a backed free block

*Figure 4*

EFFICIENT SCAVENGING OF DATA AND METADATA FILE SYSTEM BLOCKS

BACKGROUND

Data storage systems typically arrange the data and metadata of file systems in blocks of storage. For example, the file data constituting files in a file system are stored in blocks of storage, as are inodes, indirect blocks, and other metadata. Data storage systems may provision storage to file systems in units of fixed size, here called "slices." Data storage systems may generate slices, for example, from one or more physical storage devices, such as RAID groups of physical storage devices.

Some data storage systems provide thinly provisioned file systems. Thinly provisioned file systems typically have very large address spaces but allocate specific storage slices to populate file systems only as storage is needed to satisfy write requests. A thinly provisioned file system may thus have an address space that is measured in petabytes but may allocate slices to occupy only a small fraction of the address space.

Data storage systems that provide thinly provisioned file systems may deallocate blocks of storage from the file systems when the blocks are no longer used, as part of file system shrink operations. In one kind of shrink operation, a data storage system identifies free blocks of storage in the slices supporting the file system. Any completely freed slices may be returned to a storage pool for later reuse.

SUMMARY

There are deficiencies with the above-described conventional shrink operation. For example, it can be wasteful and time-consuming to perform certain kinds of processing on free blocks that have no backing store.

Some data storage systems employ architectures in which an "upper deck file system," which may be accessible to hosts, for example, is represented internally in the form of a file of a "lower deck file system." A data storage system according to this design may respond to write operations in the upper deck file system by allocating blocks in the lower deck file system and then writing to those blocks. In an example, the upper deck file system may organize blocks according to whether they are free or allocated. However, the organization in the upper deck file system does not conventionally distinguish between free blocks that have been allocated from the lower deck, i.e., supported by actual storage, and free blocks that are merely there as place holders, i.e., address spaces where blocks from the lower deck might be allocated at some other time.

Consequently, during a file system shrink operation, the upper deck file system may identify many free blocks, but some of those free blocks are merely placeholders that have never been allocated from the lower deck. Since the upper deck file system cannot distinguish free blocks that have been allocated from blocks that are merely placeholders, the data storage system can waste much time and resources attempting to free blocks in the lower deck that are not associated with any underlying storage.

In contrast with the conventional file system shrink operation, an improved technique involves identifying the locations of backed free blocks within the upper deck file system, where "backed free blocks" are blocks that have been provisioned from storage devices of the data storage system to the lower deck file system, allocated from the lower deck file system to the upper deck file system, and later freed from the upper deck file system. To perform the improved shrink operation, a storage processor accesses a set of data structures that identify such backed free blocks and frees the blocks in the lower deck file system from which each of the respective backed free blocks were allocated. The storage processor then updates the set of data structures to indicate that the respective backed free blocks are simply free blocks.

Advantageously, the improved technique provides for more efficient reclaiming of storage space in a data storage system. Because the storage processor is operating only on backed free blocks and is ignoring free blocks that have no underlying storage, processor resources are not wasted in "freeing" storage that does not exist.

Certain embodiments of the improved technique are directed to a method of scavenging free storage space in a thinly provisioned upper deck file system stored in the form of a file in an underlying lower deck file system of a data storage apparatus. The method includes accessing, by a storage processor of the data storage apparatus, a set of data structures to identify the location of each of a set of backed free blocks within the upper deck file system, wherein backed free blocks are blocks that have been provisioned from storage devices of the data storage apparatus to the lower deck file system, allocated from the lower deck file system to the upper deck file system, and later freed from the upper deck file system. The method also includes, for each of the set of backed free blocks, (i) freeing the block in the lower deck file system from which the respective backed free block was allocated and (ii) updating the set of data structures to indicate that the respective back free block is no longer a backed free block.

Additionally, some embodiments of the improved technique are directed to a data storage apparatus constructed and arranged to scavenge free storage space in a thinly provisioned upper deck file system stored in the form of a file in an underlying lower deck file system. The data storage apparatus includes a set of storage devices and a storage processor. The storage processor includes memory and a set of processors coupled to the memory to form controlling circuitry. The controlling circuitry is constructed and arranged to carry out the method of scavenging free storage space in a thinly provisioned upper deck file system stored in the form of a file in an underlying lower deck file system.

Furthermore, some embodiments of the improved technique are directed to a computer program product having a non-transitory computer readable storage medium which stores code including a set of instructions which, when executed by a computer, cause the computer to carry out the method of scavenging free storage space in a thinly provisioned upper deck file system stored in the form of a file in an underlying lower deck file system of a data storage apparatus.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4 is a flow chart illustrating an example method of carrying out the improved technique within the electronic environment shown in FIG. 1.

DETAILED DESCRIPTION

An improved technique for shrinking a file system involves identifying backed free blocks within an upper deck file system and freeing blocks in a lower deck file system corresponding to the backed free blocks. Doing this, the UD FS notifies the LD FS of unused blocks, which may eventually form entire free slices, may then be deallocated from the LD FS via a conventional shrink operation.

Figure 1:
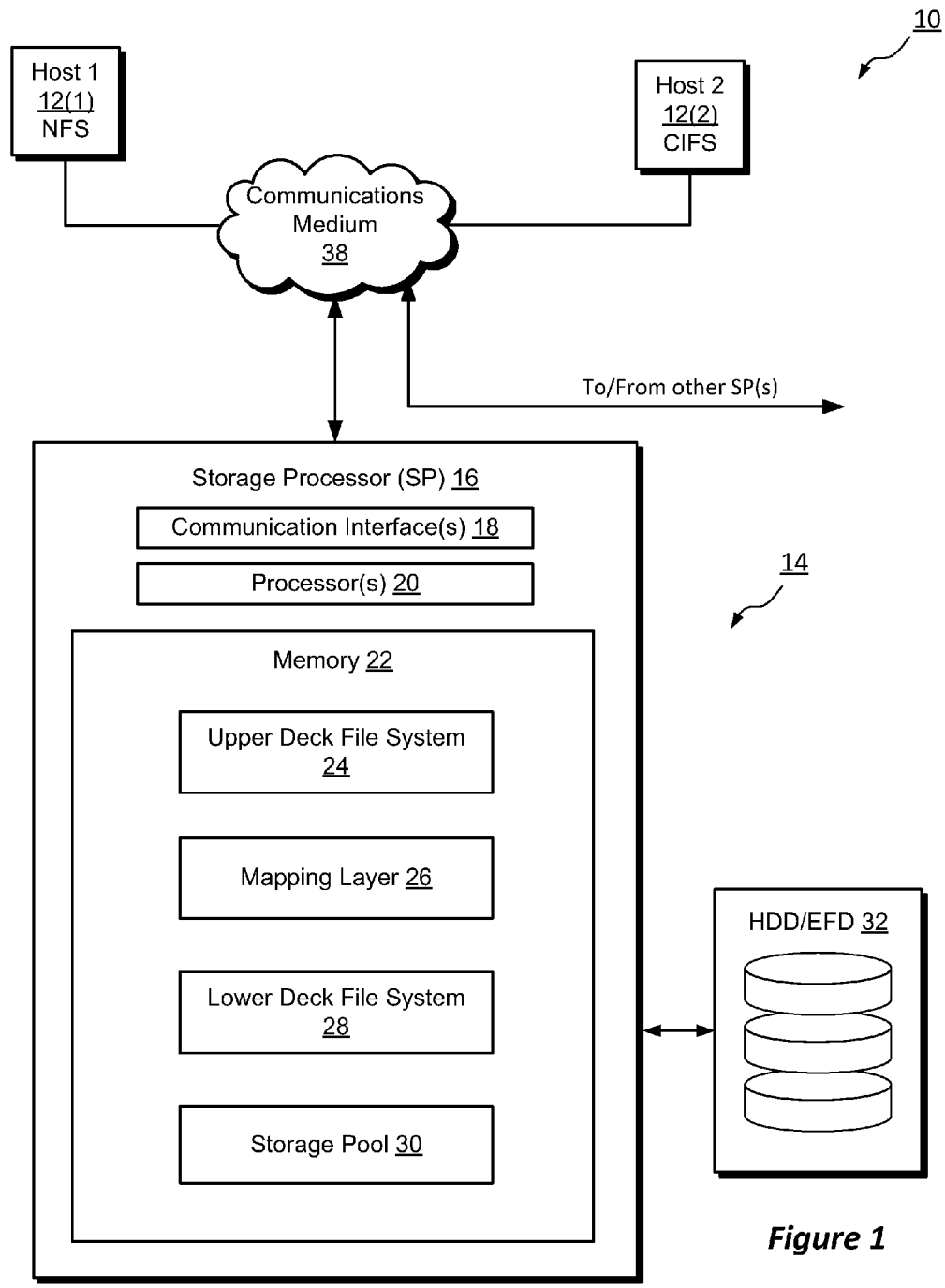
FIG. 1 is a block diagram illustrating an example electronic environment in which the improved technique may be carried out.

FIG. 1 illustrates an example electronic environment 10 for which the improved technique is carried out. Electronic environment 10 includes hosts 12(1) and 12(2), communications medium 38, and data storage system 14 which in turn includes storage processor 16 and storage devices 32. Storage devices 32 are provided, for example, in the form of hard disk drives and/or electronic flash drives (EFDs). Although not shown in FIG. 1, data storage system 14 may include multiple storage processors like storage processor 16. For instance, multiple storage processors may be provided as circuit board assemblies, or "blades," which plug into a chassis that encloses and cools the storage processors. The chassis has a backplane for interconnecting the storage processors, and additional connections may be made among storage processors using cables. It should be understood, however, that no particular hardware configuration is required, as any number of storage processors (including a single one) can be provided and storage processor 16 can be any type of computing device.

Communications medium 38 can be any type of network or combination of networks, such as a storage area network (SAN), local area network (LAN), wide area network (WAN), the Internet, and/or some other type of network, for example. In an example, hosts 12(1) and 12(2) connect to storage processor 16 using various technologies. For example, host 12(1) can connect to the storage processor 16 using NFS (e.g., through a SAN), while host 12(2) can connect to the storage processor 16 using CIFS. Any number of hosts (not pictured) may be provided, using any of the above protocols, some subset thereof, or other protocols besides those shown. As is known, NFS, SMB 3.0, and CIFS are file-based protocols. Storage processor 16 is configured to receive file system requests according to file-based protocols and to respond to such file system requests by reading or writing storage device 18.

Hosts 12(1) and 12(2) may be configured to send file system requests to storage processor 16 via communications medium 18. In some arrangements, hosts 12(1) and 12(2) are desktop computers; in other arrangements, hosts 12(1) and 12(2) can each be a server, a laptop computer, a tablet computer, or any other electronic device having a processor capable of issuing requests.

Storage processor 16 is seen to include a communication interface 18, a processor 20, and memory 22. Communication interface 18 includes, for example, network interface adapters, for converting electronic and/or optical signals received from the communications medium 38 to electronic form for use by storage processor 16. Processor 20 includes one or more processing chips and/or assemblies. In a particular example, the processor 20 includes numerous multi-core CPUs. Memory 22 includes both volatile memory (e.g., RAM), and non-volatile memory, such as one or more ROMs, disk drives, solid state drives (SSDs), and the like. Processor 20 and memory 22 together form control circuitry, which is constructed and arranged to carry out various methods and functions as described herein. Also, memory 22 includes a variety of software constructs realized in the form of executable instructions. When the executable instructions are run by processor 20, processor 20 is caused to carry out the operations of the software constructs. Although certain software constructs are specifically shown and described, it is understood that memory 22 typically includes many other software constructs, which are not shown, such as an operating system, various applications, processes, and daemons.

As shown, memory 22 includes an upper deck file system 24, a mapping layer 26, a lower deck file system 28, and a storage pool 30.

In an example, the upper deck file system 24 is a host file system, which may be accessed by the hosts 112(1-2) for creating files and/or directories, deleting files and/or directories, reading files, writing files, and so forth. Within the data storage system 14, the upper deck file system 24 is represented internally as a file of the lower-deck file system 28 (described below).

Mapping layer 26 maps the upper deck file system 24 to the corresponding underlying file stored in the lower-deck file system 28. For example, particular blocks of the upper deck file system 24 are mapped to corresponding blocks of the lower deck file system 28.

Storage pool 30 organizes elements of the storage 32 in the form of slices. A "slice" is an increment of storage space, such as 256 MB in size, which is drawn from the storage 32. Pool 30 may allocate slices to the lower-deck file system 28 for use in storing its content. Pool 30 may also deallocate slices from lower deck file systems 28 if the storage provided by the slices is no longer required. Further details of memory 22 are discussed below in connection with FIG. 2.

Figure 2:
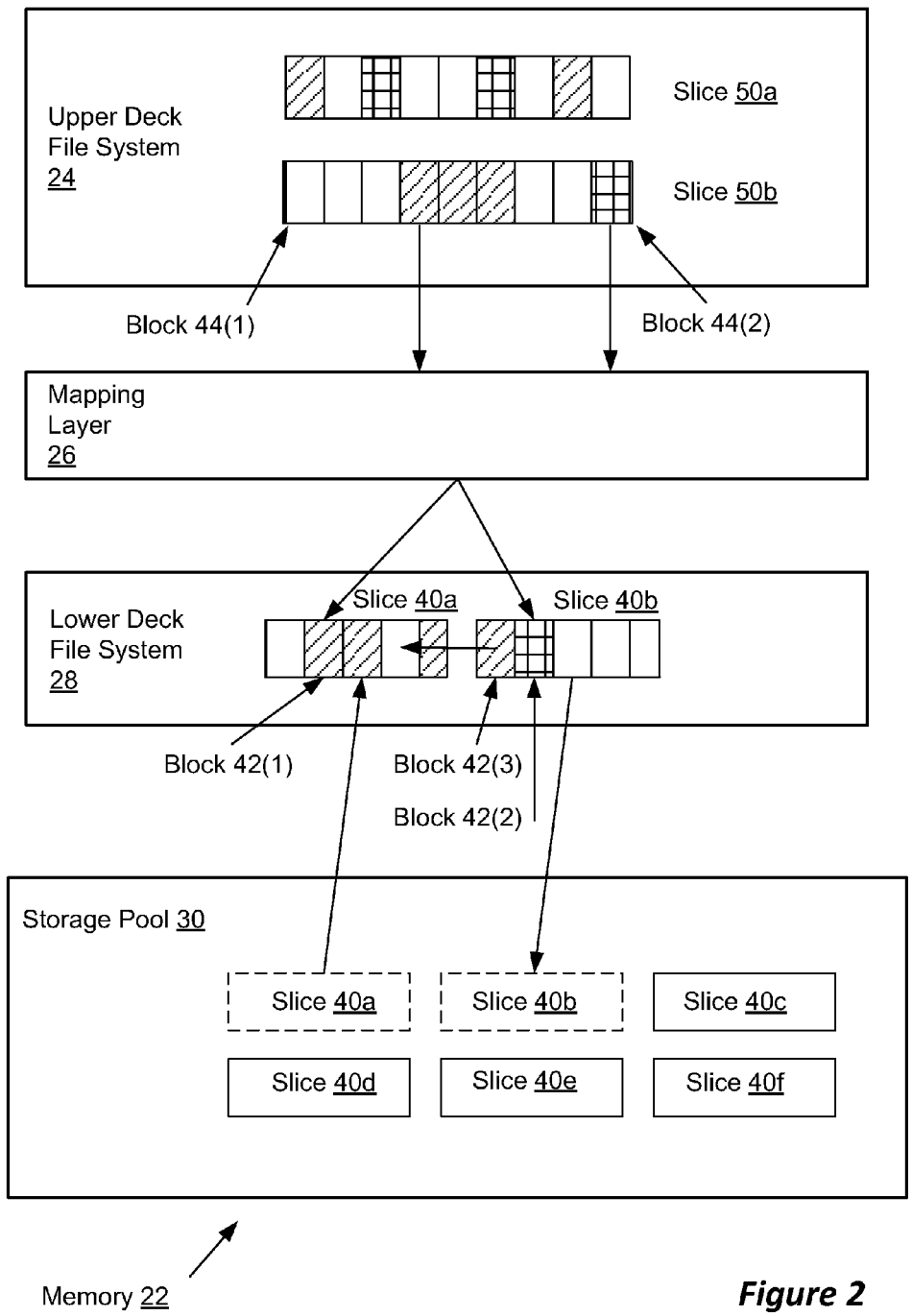
FIG. 2 is a block diagram illustrating an example upper deck file system and lower deck file system of the electronic environment shown in FIG. 1.

FIG. 2 illustrates further details of example upper deck file system 24, example mapping layer 26, example lower deck file system 28, and example storage pool 30.

Upper deck file system 24 according to FIG. 2 includes slices 50*a* and 50*b*. Each of slices 50*a* and 50*b* contains logical blocks including block 44(1) and 44(2). Each of the logical blocks in slices 50*a* and 50*b* has one of two states: free (i.e., not storing active content) or allocated i.e., (, cross-hatched), and written to (i.e., possessing data, diagonal hatch). That said, a free block may be backed (i.e., written to then deleted, associated with a block of storage in the lower deck), or unbacked (i.e., not associated with a block of storage in the lower deck).

Lower deck file system 28 according to FIG. 2 includes slices 40*a* and 40*b*, each of which is provisioned by storage pool 30 and contain blocks of storage including blocks 42(1), 42(2), and 42(3). In lower deck file system 28, blocks in slices 40*a* and 40*b* have one of two states: free, or allocated. That said, a third option, denoted by the crosshatch, represents a block in which a hole has been punched; i.e, storage space in the block has been decoupled from a logical block in upper deck file system 24.

Storage pool 30 according to FIG. 2 includes slices 40*a*, 40*b*, 40*c*, 40*d*, 40*e*, and 40*f*. Slices 40*a* and 40*b* are provisioned to lower deck file system 28, while the other slices may be provisioned to other resources or may be free.

During example operation, upper deck file system 24 is thinly provisioned. The logical blocks, when written into and allocated from lower deck file system 28, correspond to blocks in slices 40*a* and 40*b* that have been provisioned from storage pool 30 by storage processor 16 (see FIG. 1). As illustrated in FIG. 2, block 44(1) in upper deck file system which has been written into corresponds to block 42(1) in lower deck file system 28. Similarly, block 44(2) in upper deck file system corresponds to block 42(2) in lower deck file system 44(2). It should be understood, however, that free blocks do not correspond to any blocks in lower deck file system 28 until they have been written into, i.e., only backed free blocks in the upper deck file system 24 correspond to blocks in the lower deck file system 28.

As host 12(1) sends file system requests to write data to blocks in slices 50a and 50b, storage processor 16 writes the data into blocks such as block 42(3). Upon writing data to a block in lower deck file system 28, storage processor 16 allocates that block of storage to upper deck file system 24. Until data is written to a block in lower deck file system 28, however, a free block in upper deck file system 24 cannot be said to correspond to any blocks in lower deck file system 28 because, in a thinly provisioned file system, storage supporting such a block in the upper deck file system 24 does not get allocated until the block has been written into.

At some point, host 12(1) sends a file system request that causes storage processor to delete the data in block 44(2) in upper deck file system 24. For example, a user of the host 12(1) may delete a file (or a portion thereof) or a directory. Thus, block 44(2) changes state from "written to" to "backed free", represented by the cross hatch pattern in FIG. 2. It should be understood that, while block 44(2) is now free, it still maintains its allocated storage space in corresponding block 42(2).

In response to the deletion command, or at some other time, storage processor 16 may initiate a scavenge operation. In response to the initiation of the scavenge operation, storage processor accesses a set of data structures to locate any backed free blocks in upper deck file system 24. Upon locating a backed free block, say 44(2), in upper deck file system 24, storage processor 16 performs a hole punching operation on block 44(2). As part of a hole punching operation, storage processor 16 locates the corresponding block—in this case, block 42(2)—that was allocated to upper deck file system in response to block 44(2) having been written into. Once storage processor 16 locates block 42(2), it frees block 42(2) by deleting any data in block 42(2).

Once storage processor 16 frees block 42(2), it then updates the set of data structures to indicate that block 44(2) is no longer a backed free block, but is rather a free block. Storage processor has disassociated block 44(2) from any storage in lower deck file system 28, although by being written into again, it may become associated with another block of storage in lower deck file system 28.

At some later time, storage processor 16 may examine slices 40a and 40b in the lower deck file system 28. If any slice is only partially filled with contents, the slice may be evacuated, such that its content is moved to another slice and it is made free of all content. The evacuated slice may then be returned to the pool 30, where it may be repurposed.

Figure 3:
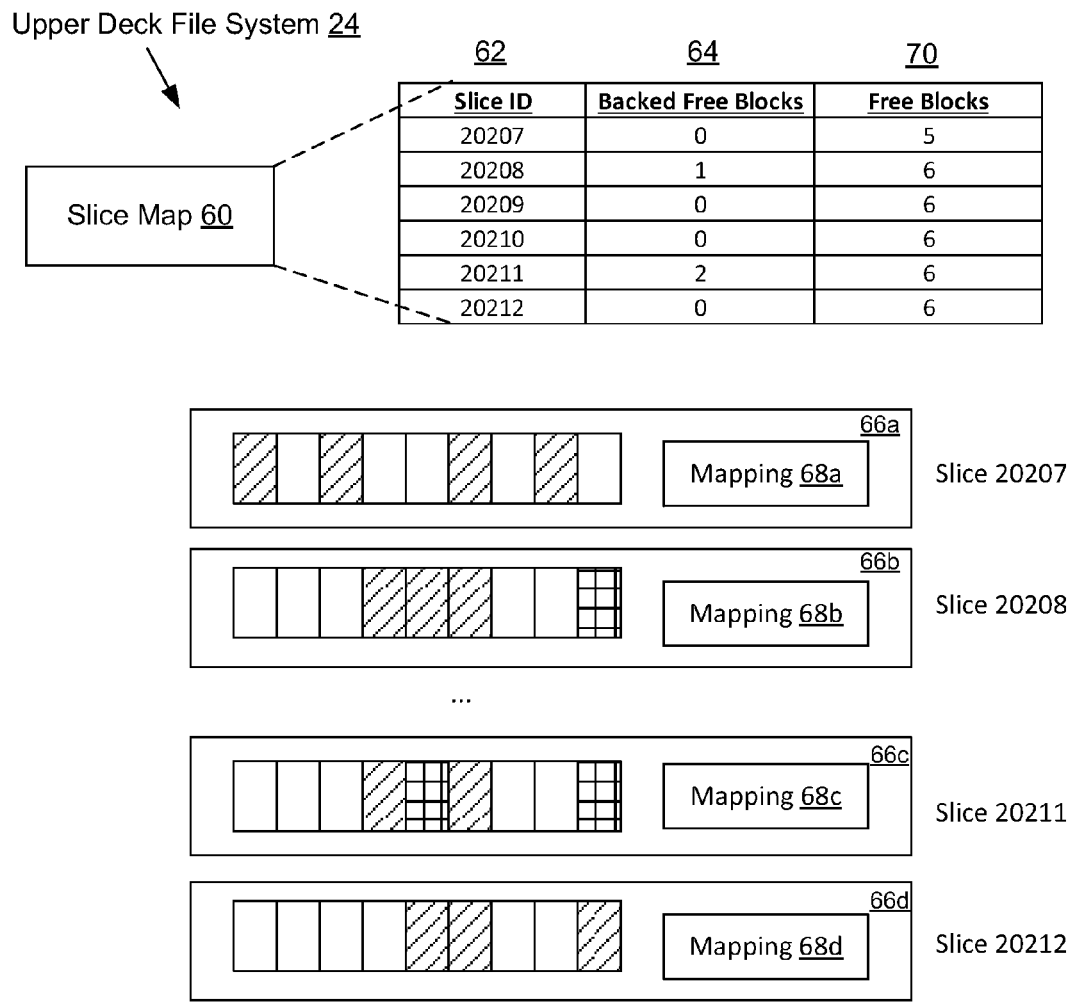
FIG. 3 is a block diagram illustrating an example upper deck file system of the electronic environment shown in FIG. 1.

It should be understood that an advantage of the above-described technique is that slices in the lower deck file system are made available to storage pool 30 in relatively few operations. By tracking backed free blocks, storage processor is able to ignore free blocks in upper deck file system 24 and thus not waste any processor time performing operations that will not result in any additional storage space being made available to storage pool 30. Further details of the above described scavenge operation are described below in connection with FIG. 3. FIG. 3 illustrates an example upper deck file system 24 including a slice map 60 and slices 66a, 66b, 66c, and 66d (slices 66). Slice map 60 is a data structure, which, among other things, tracks the number of free blocks and the number of backed free blocks in each slice 66 of the upper deck file system 24. In the example illustrated in FIG. 3, slice map 60 takes the form of a table having a slice ID field 62, a backed free blocks field 64, and free blocks field 70 which includes all free blocks in its count. Slice ID field 62 provides an identifier for each slice in upper deck file system 24. Backed free blocks field 64 provides, for each slice identifier 62, a count indicating a current number of backed free blocks within the respective slice.

Also illustrated in FIG. 3 are example slices 66 that house logical blocks within upper deck file system 24. Within each slice 66, there is a mapping construct 68 that identifies the locations of the backed free blocks within that slice. In some arrangements, mapping construct 68 may be a bitmap in which each bit indicates whether a logical block corresponding to that bit is a backed free block.

During operation, storage processor 16 accesses slice map 60 as part of a background operation. Storage processor 16 then makes a decision whether to initiate a scavenge operation based on contents of slice map 60. For example, storage processor 16 may aggregate the number of backed free blocks in backed free blocks field 64 across all slices to produce an aggregated number of backed free blocks in the UDFS. In this case, if the aggregated number of backed free blocks is greater than a predetermined threshold number of backed free blocks, then storage processor 16 initiates the scavenge operation. It is understood, however, that the scavenge operation may be conducted at any time and/or in response to any event.

It should be understood, however, that there may be other triggers for initiating a scavenge operation, such as exceeding a threshold number of backed free blocks in upper deck file system 24 or in response to a manual command from host 12(1).

Upon initiating the scavenge operation, storage processor 16 performs a lookup on the slice map 60 to determine which slices 66 have at least one backed free block. For each such slice 66—in the example illustrated in FIG. 3, slices 66b and 66c—storage processor accesses the corresponding mapping constructs (68b/68c) in the respective slice. In the example of mapping construct 68b being a bitmap, storage processor 16 reads that bitmap to determine positions of bits indicating which logical blocks within slice 66b are backed free blocks. Upon making this determination, storage processor 16 then punches holes in those blocks as described above.

In some arrangements, for each backed free block for which storage processor 16 punches a hole, storage processor 16 decrements the backed-free block counter 64 corresponding to slice 66b by one. If storage processor 16 completes the scavenge operation for a slice 66, then the counter for that slice will read zero. It should be understood that the free counter 70 does not change; free counter only changes when a block is written into.

FIG. 4 illustrates a method 90 of scavenging free storage space in a thinly provisioned upper deck file system stored in the form of a file in an underlying lower deck file system of a data storage apparatus, including steps 92 and 94.

In step 92, a set of data structures are accessed to identify the location of each of a set of backed free blocks within the upper deck file system, wherein backed free blocks are blocks that have been provisioned from storage devices of the data storage apparatus to the lower deck file system, allocated from the lower deck file system to the upper deck file system, and later freed from the upper deck file system. As described above, such data structures may take the form of a slice map 60 as well as individual mapping constructs within each slice such as a bitmap.

In step 94, for each of the set of backed free blocks, (i) the block in the lower deck file system from which the respective backed free block was allocated is freed and (ii) the set of data structures is updated to indicate that the respective back free block is no longer a backed free block. As described above, updating the data structures may involve decrementing a counter within a slice in which a hole was punched.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, while the examples described above referred mainly to data storage systems that use slice maps, one may use direct block maps in the upper deck file system. Further, the upper deck file system and the mapping layer may themselves reside on the client, and a block protocol (SCSI, for example) connects the client mapping layer to the lower deck file system on the storage processor.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of scavenging free storage space in a thinly provisioned upper deck file system stored in the form of a file in an underlying lower deck file system of a data storage apparatus, the method comprising:
   accessing, by a storage processor of the data storage apparatus, a set of data structures to identify the location of each of a set of backed free blocks within the upper deck file system,
   wherein the backed free blocks are blocks that have been provisioned from storage devices of the data storage apparatus to the lower deck file system, allocated from the lower deck file system to the upper deck file system, and later freed from the upper deck file system; and
   for each of the set of backed free blocks, (i) freeing the block in the lower deck file system from which the respective backed free block was allocated and (ii) updating the set of data structures to indicate that the respective back free block is no longer a backed free block,
   wherein accessing the set of data structures to identify the location of each of a set of backed free blocks within the upper deck file system includes identifying, from the set of data structures, a set of slices in the upper deck file system that each include at least one backed free block,
   wherein blocks in the lower deck file system are arranged in lower deck slices, and
   wherein the method further comprises (i) computing a number of freed blocks in at least one lower deck slice, and (ii) comparing the number of freed blocks to a threshold number of freed blocks to produce a comparison result indicative of a readiness to return the at least one lower deck slice to a storage pool.

2. A method as in claim 1,
   wherein the upper deck file system includes multiple upper deck slices into which blocks are allocated from the lower deck file system.

3. A method as in claim 2,
   wherein accessing the set of data structures to identify the location of each of a set of backed free blocks within the upper deck file system further includes:
   accessing an upper deck slice map identifying the upper deck slices in the upper deck file system which have at least one backed free block.

4. A method as in claim 2,
   wherein the set of data structures includes a mapping construct in each upper deck data slice that contains at least one backed free block,
   wherein the mapping construct indicates which blocks within the respective upper deck slice are backed free blocks;
   wherein accessing the set of data structures further includes:
   reading the mapping construct of each upper deck slice that has at least one backed free block, and
   wherein freeing the blocks in the lower deck file system includes locating blocks in the lower deck file system as indicated in the mapping construct, and marking those blocks in the lower deck file system as free.

5. A method as in claim 2,
   wherein the method further comprises:
   after freeing the blocks in the lower deck file system indicated by the mapping construct, identifying a lower deck slice that contains the freed blocks;
   relocating allocated blocks within the lower deck slice; and
   after relocating the allocated blocks that have data, returning the lower deck slice to the storage pool, lower deck slices in the storage pool being available for use elsewhere.

6. A method as in claim 1,
   wherein the method of scavenging free storage space is performed in response to the number of backed free blocks exceeding a predetermined threshold.

7. A method as in claim 6,
   wherein the set of data structures includes a counter for each slice indicative of a number of backed free blocks in that slice; and
   wherein the method further comprises:

computing an aggregate number of backed free blocks as indicated by the counter for each slice.

8. A method as in claim 7,
wherein updating the set of data structures to indicate that the respective back free block is no longer a backed free block includes:
decrementing the counter for the slice which has the backed free block.

9. A method as in claim 1,
wherein the upper deck file system is a host file system accessed by hosts external to the storage processor and connected to the storage processor over a network.

10. A method as in claim 1,
wherein the method further comprises providing a mapping of particular blocks of the upper deck file system to corresponding blocks of the lower deck file system; and
wherein freeing the block in the lower deck file system from which the respective backed free block was allocated includes locating the block in the lower deck file system according to the mapping.

11. A data storage apparatus for scavenging free storage space in a thinly provisioned upper deck file system stored in the form of a file in an underlying lower deck file system of the data storage apparatus, the data storage apparatus comprising:
a set of storage devices; and
a storage processor, the storage processor including:
memory; and
a set of processors coupled to the memory to form controlling circuitry, the controlling circuitry constructed and arranged to:
access a set of data structures to identify the location of each of a set of backed free blocks within the upper deck file system,
wherein the backed free blocks are blocks that have been provisioned from storage devices of the data storage apparatus to the lower deck file system, allocated from the lower deck file system to the upper deck file system, and later freed from the upper deck file system; and
for each of the set of backed free blocks, (i) free the block in the lower deck file system from which the respective backed free block was allocated and (ii) update the set of data structures to indicate that the respective back free block is no longer a backed free block,
wherein the controlling circuitry, constructed and arranged to access the set of data structures to identify the location of each of a set of backed free blocks within the upper deck file system, is further constructed and arranged to identify, from the set of data structures, a set of slices in the upper deck file system that each include at least one backed free block,
wherein blocks in the lower deck file system are arranged in lower deck slices, and
wherein the controlling circuitry is further constructed and arranged to (i) compute a number of freed blocks in at least one lower deck slice, and (ii) compare the number of freed blocks to a threshold number of freed blocks to produce a comparison result indicative of a readiness to return the at least one lower deck slice to a storage pool.

12. A data storage apparatus as in claim 11,
wherein the upper deck file system includes multiple upper deck slices into which blocks are allocated from the lower deck file system.

13. A data storage apparatus as in claim 12,
wherein the controlling circuitry constructed and arranged to access the set of data structures to identify the location of each of a set of backed free blocks within the upper deck file system is still further constructed and arranged to:
access an upper deck slice map identifying the upper deck slices in the upper deck file system which have at least one backed free block.

14. A data storage apparatus as in claim 12,
wherein the set of data structures includes a mapping construct in each upper deck data slice that contains at least one backed free block,
wherein the mapping construct indicates which blocks within the respective upper deck slice are backed free blocks;
wherein the controlling circuitry constructed and arranged to access the set of data structures to identify the location of each of a set of backed free blocks within the upper deck file system is further constructed and arranged to:
read the mapping construct of each upper deck slice that has at least one backed free block, and
wherein the controlling circuitry constructed and arranged to free the blocks in the lower deck file system is further constructed and arranged to locate blocks in the lower deck file system as indicated in the mapping construct, and mark those blocks in the lower deck file system as free.

15. A data storage apparatus as in claim 12,
wherein the controlling circuitry is further constructed and arranged to:
after freeing the blocks in the lower deck file system indicated by the mapping construct, identify a lower deck slice that contains the freed blocks;
relocate allocated blocks within the lower deck slice; and
after relocating the blocks that have data, return the lower deck slice to the storage pool, lower deck slices in the storage pool being available for use elsewhere.

16. A computer program product having a non-transitory, computer-readable storage medium which stores instructions which, when executed by a computer, cause the computer to perform a method of scavenging free storage space in a thinly provisioned upper deck file system stored in the form of a file in an underlying lower deck file system of a data storage apparatus, the method comprising:
accessing, by a storage processor of the data storage apparatus, a set of data structures to identify the location of each of a set of backed free blocks within the upper deck file system, wherein the backed free blocks are blocks that have been provisioned from storage devices of the data storage apparatus to the lower deck file system, allocated from the lower deck file system to the upper deck file system, and later freed from the upper deck file system; and
for each of the set of backed free blocks, (i) freeing the block in the lower deck file system from which the respective backed free block was allocated and (ii) updating the set of data structures to indicate that the respective back free block is no longer a backed free block,
wherein accessing the set of data structures to identify the location of each of a set of backed free blocks within the upper deck file system includes identifying, from the set of data structures, a set of slices in the upper deck file system that each include at least one backed free block, wherein blocks in the lower deck file system are arranged in lower deck slices, and wherein the method further comprises (i) computing a number of freed blocks in at least one lower deck slice, and (ii) comparing the number of freed blocks to a threshold number of freed blocks to produce a comparison result indicative of a readiness to return the at least one lower deck slice to a storage pool.

17. A computer program product as in claim 16, wherein the upper deck file system includes multiple upper deck slices into which blocks are allocated from the lower deck file system.

18. A computer program product as in claim 17, wherein accessing the set of data structures to identify the location of each of a set of backed free blocks within the upper deck file system further includes:

accessing an upper deck slice map identifying the upper deck slices in the upper deck file system which have at least one backed free block.

19. A computer program product as in claim 17, wherein the set of data structures includes a mapping construct in each upper deck data slice that contains at least one backed free block, wherein the mapping construct indicates which blocks within the respective upper deck slice are backed free blocks;

wherein accessing the set of data structures further includes:

reading mapping construct of each upper deck slice that has at least one backed free block, and wherein freeing the blocks in the lower deck file system includes locating blocks in the lower deck file system as indicated in the mapping construct, and marking those blocks in the lower deck file system as free.

20. A computer program product as in claim 17, wherein the method further comprises:

after freeing the blocks in the lower deck file system indicated by the mapping construct, identifying a lower deck slice that contains the freed blocks;

relocating allocated blocks within the lower deck slice; and after relocating the blocks that have data, returning the lower deck slice to the storage pool, lower deck slices in the storage pool being available for use elsewhere.

21. A computer program product as in claim 16, wherein the method of scavenging free storage space is performed in response to the number of backed free blocks exceeding a predetermined threshold.

\* \* \* \* \*